United States Patent [19]

Kopp

[11] Patent Number: 4,603,540
[45] Date of Patent: Aug. 5, 1986

[54] APPARATUS FOR MAKING PACKAGING BAGS

[75] Inventor: Georg Kopp, Uhwiesen, Switzerland

[73] Assignee: SIG Schweizerische Industrie-Gesellschaft, Neuhausen am Rheinfall, Switzerland

[21] Appl. No.: 622,743

[22] Filed: Jun. 20, 1984

[30] Foreign Application Priority Data

Jun. 20, 1983 [CH] Switzerland ............ 3366/83

[51] Int. Cl.⁴ .......................... B65B 9/02
[52] U.S. Cl. ........................ 53/546; 53/554
[58] Field of Search ............ 53/546, 553, 554, 555, 53/451, 450

[56] References Cited

U.S. PATENT DOCUMENTS

| | | | |
|---|---|---|---|
| 3,054,236 | 9/1962 | Stroop | 53/554 |
| 3,077,063 | 2/1963 | Stroop | 53/546 |
| 3,383,269 | 5/1968 | Kopp | 53/555 X |
| 3,391,047 | 7/1968 | Kopp | 53/554 X |
| 3,641,737 | 2/1972 | Tamagni | 53/554 |
| 4,004,399 | 1/1977 | Borrello | 53/554 |
| 4,291,520 | 9/1981 | Prince et al. | 53/373 X |

FOREIGN PATENT DOCUMENTS

| | | | |
|---|---|---|---|
| 362354 | 10/1922 | Fed. Rep. of Germany | 53/546 |
| 359398 | 2/1962 | Italy | 53/546 |
| 416434 | 1/1967 | Switzerland . | |
| 1271214 | 4/1972 | United Kingdom . | |

*Primary Examiner*—James F. Coan
*Attorney, Agent, or Firm*—Spencer & Frank

[57] ABSTRACT

An apparatus for making sealed packages from two superposed, sealable flexible wrapper sheets, has first and second convex support rings which are radially adjacent for guiding respective first and second wrapper sheets towards one another. First and second sealing discs are supported coaxially with the respective support rings at opposite sides thereof. The sealing discs form sealing disc pairs for longitudinally pressing and sealing together the wrapper sheets along opposite edge zones thereof to form longitudinal seams. There are further provided deflecting rollers situated upstream of the respective support rings for defining loop-around paths for the wrapper sheets on the respective support rings. Each support ring carries a shaping element for shaping the wrapper sheets immediately upstream of the sealing discs. The apparatus also has a sealing station for providing a transverse cutter for severing the sealed sheets into predetermined lengths whereby packages of defined dimensions are obtained.

20 Claims, 5 Drawing Figures

APPARATUS FOR MAKING PACKAGING BAGS

BACKGROUND OF THE INVENTION

This invention relates to an apparatus which is associated with a packaging machine and which serves for the making of packaging bags from converging separate sealable sheets directed by means of sheet guides to a first sealing station where longitudinal seams are provided and to a second sealing station where the sealing sheets are sealed together by transverse seams.

U.S. Pat. No. 4,291,520 discloses an apparatus wherein a wrapper sheet drawn from a supply reel is shaped about a hollow mandrel by a shaping shoulder and subsequently a longitudinal seam and transverse seams are formed. The bags are charged with the goods by means of the hollow mandrel. The filled bags which are closed with three seams are subsequently severed from the sheets. A further example of a packaging machine of this type is described in Swiss Pat. No. 416,434 or British Pat. No. 1,271,214.

British Pat. No. 1,271,214 discloses a plurality (for example, four) hollow mandrels arranged side by side. The two wrapper sheets are sealed by means of sealing rollers in the zone of the hollow mandrels along five paths so that four side-by-side arranged bags are formed. Underneath the discharge end of the hollow mandrels a pair of sealing shoes are provided for forming a transverse seam. Cutting means for severing the bags from the sheets are incorporated in the sealing shoes. By means of a rotary roller provided with suction cups the bag rows, each contaning four bags, are deposited into conveying compartments of a conveyor apparatus.

According to Swiss Pat. No. 416,434, a wrapper sheet is withdrawn from a single supply reel and then divided in the middle into two wrapper sheets which are directly advanced to a shaping guide by a deflecting mechanism. Thereafter, rollers provide longitudinal and transverse sealing ribs on the bag. Subsequent to sealing the bags on all sides, they are severed first longitudinally and then in a transverse direction.

No guide arrangements for the wrapper sheets prior to the sealing step are provided in either of the above-outlined conventional structures; rather, both wrapper sheets are directly shaped about the hollow mandrel and then sealed. Relatively rigid films cannot be processed in this manner because during the filling step and during the provision of the longitudinal seam a tension in the transverse direction is generated so that the sealing seam cannot be made without stresses. Such seams result in defective seals. This problem could be avoided if it were possible to cut the wrapper sheets into strips before their shaping. In both of the above-described conventional arrangements, the cutting stations are situated downstream of the sealing station as viewed in the direction of wrapper sheet advance. It is, however, not feasible to arrange a longitudinal cutter upstream of the shaping and sealing stations in the described structures, because a sufficient lateral guide is not present and, as a result, the wrapper strips would run off laterally.

SUMMARY OF THE INVENTION

It is an object of the invention to provide an improved apparatus particularly of the type disclosed in Swiss Pat. No. 416,434 to ensure that the filled individual bags are of high quality and wherein the stiffness of the packaging material has no appreciable effect on the bag making process.

This object and others to become apparent as the specification progresses, are accomplished by the invention, according to which, briefly stated, for each wrapper sheet there is provided at least one convex support ring between spaced coaxial sealing disc pairs which provide the longitudinal seam. Further, for defining the loop-around path of the wrapper sheets on the sealing disc pairs, upstream of each sealing disc pair, in cooperation therewith, a deflecting mechanism is provided. The support rings are equipped with shaping elements for shaping the bag walls.

DESCRIPTION OF THE PREFERRED EMBODIMENT

Figure 1:
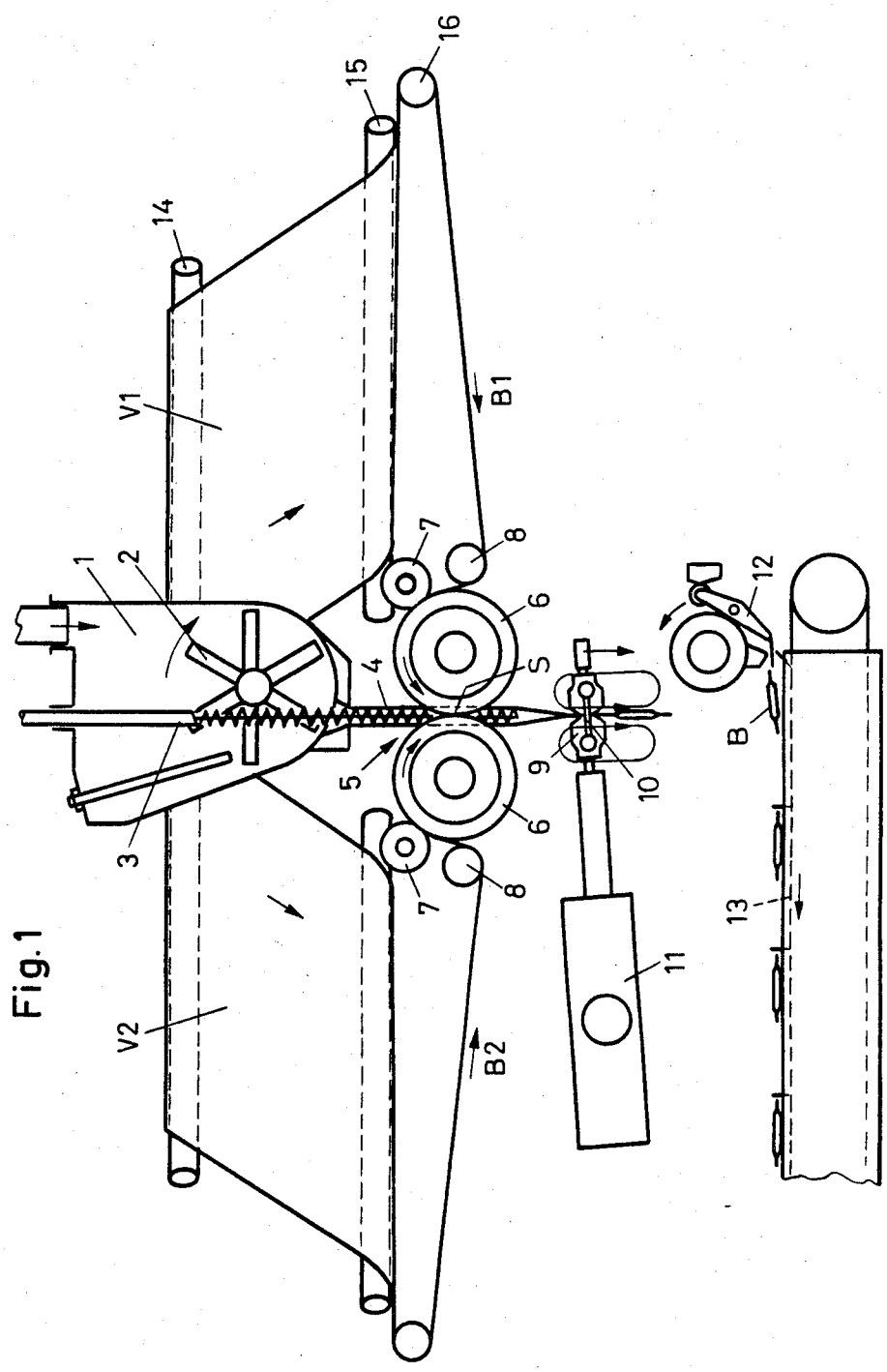
FIG. 1 is a schematic side elevational view of a preferred embodiment of the invention.

Turning now to FIG. 1, there is shown a part of a packaging machine which comprises a charging hopper 1 in which there is disposed a vaned mixing wheel 2. A conveyor screw 4 passes vertically through the hopper 1 and is surrounded, underneath the hopper 1, by a hollow filling mandrel 4 extending downwardly from a lower portion of the hopper 1. Underneath the hopper 1 there is disposed a sealing station 5 including a pair of cooperating sealing discs 6 and there are further arranged longitudinally operating circular cutting knives 7 and deflecting rollers 8 situated upstream of the sealing discs 6. Downstream of the sealing station 5 there is arranged a transverse heating device 9 equipped with severing knives 10 operated by a drive 11 for imparting oscillating motion thereto. Details of the cutting drive are known and are disclosed, for example, in U.S. Pat. No. 4,291,520. The individual, severed bags B discharged by the cutting device 10 are grasped by a gripper 12 and deposited on a conveyor belt 13.

The division of the wrapper sheet in two part-sheets V1 and V2 is effected in a manner disclosed in Swiss Pat. No. 416,434. For simplifying the drawing, the supply reel situated behind the charging hopper 1 and the severing knife are not illustrated. The two part-sheets V1 and V2 are, subsequent to their separation, formed by a first guide roller 14, a second guide roller 15 and two third guide rollers 16 into two wrapper sheets B1 and B2 which run in opposite directions.

Figure 2:
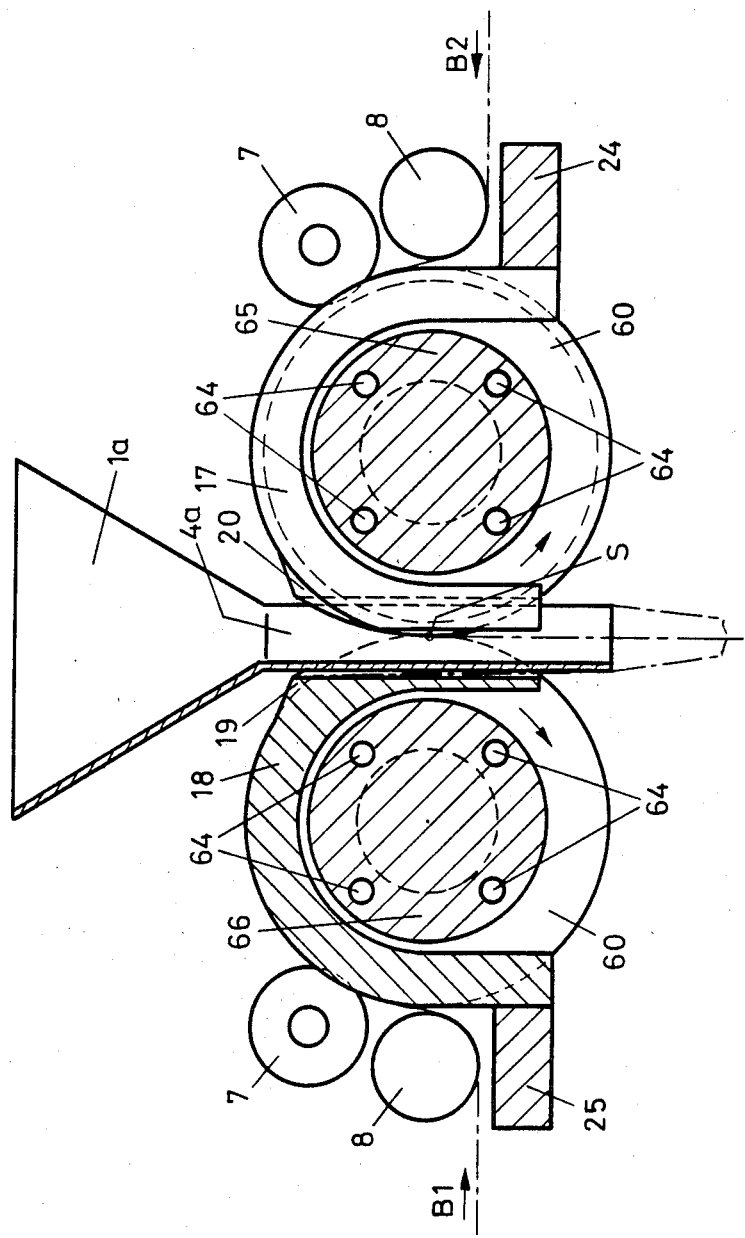
FIG. 2 is an enlarged sectional side elevational view taken along line II—II of FIG. 3.
Figure 3:
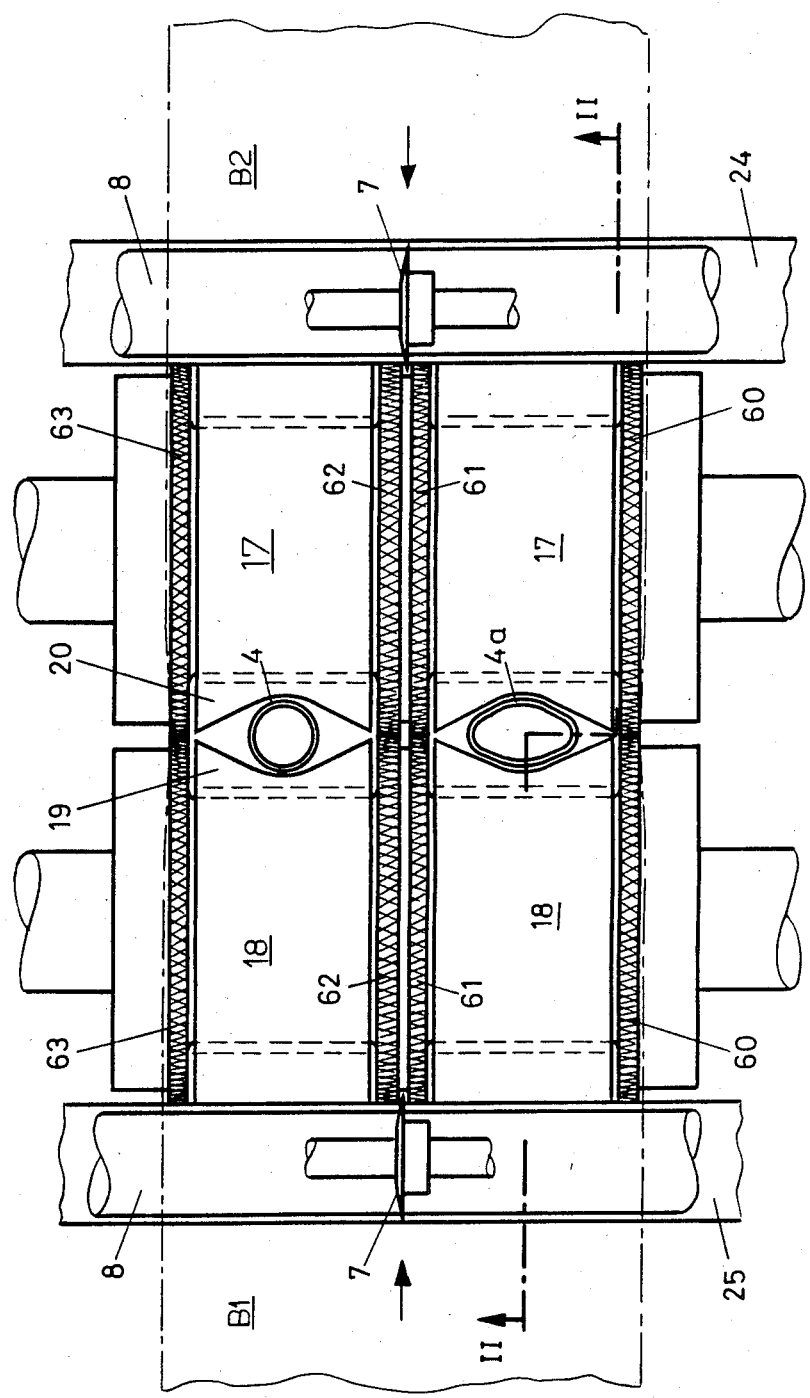
FIG. 3 is a top plan view of a sealing station forming a part of the preferred embodiment.

Also referring to FIGS. 2 and 3, as the two wrapper sheets B1 and B2 leave the respective guide rollers 8, they run onto convex support rings 17, 18 each having, on either side, pairwise cooperating sealing discs 60, 61, 62, 63. As shown in FIG. 2, the sealing discs 60–63 are mounted on carrier rollers 65 and 66 which are equipped with heating elements 64. The peripheral working surfaces of the sealing discs are in axial alignment with the peripheral convex guiding faces of the support rings. FIG. 2 further shows two shaping shoulders 19 and 20 which project beyond the circumferential outline of the sealing discs 60–63.

The forming shoulders 19 and 20 are of outwardly concave configuration and surround the hollow mandrel 4 along a part of its circumference so that both wrapper sheets B1 and B2 which at that location are divided, for example, into two strips by respective cutters 7, are formed each with an air gap about the hollow mandrel 4 and are connected to one another by means of longitudinal seams provided by the sealing discs 60–63. The forming shoulders extend at least approximately tangentially relative to the peripheral working surfaces of the sealing discs.

In FIG. 3 there are shown, in a single structural unit, two differently shaped hollow mandrels 4 and 4a. It will be understood that in practice, the hollow mandrels will be of identical construction for the same machine. Referring now particularly to FIG. 2, the goods, measured, for example, by weighing, are introuced through the hollow mandrel 4a by gravity from the charging hopper 1a (FIG. 2) into the bags. The path of the wrapper sheets B1, B2 is illustrated with dash-dotted lines. This arrangement is a variant as compared to the FIG. 1 structure where the goods are delivered by means of the conveyor screw 3 through the hollow mandrel in a cylindrical column.

Figure 4:
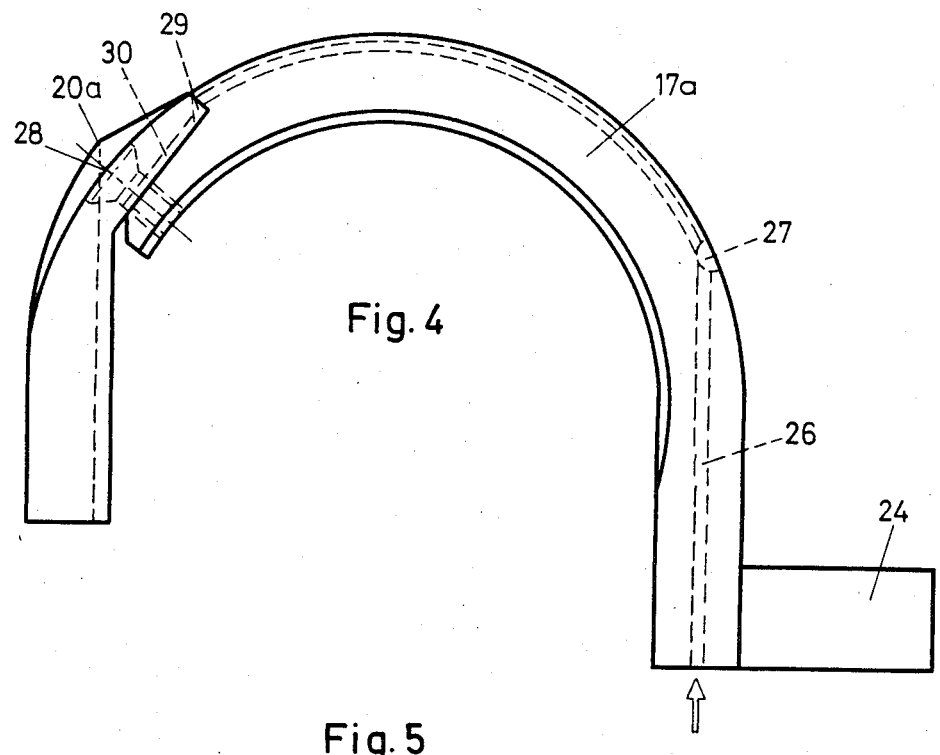
FIG. 4 is an enlarged top plan view of a component of the preferred embodiment.
Figure 5:
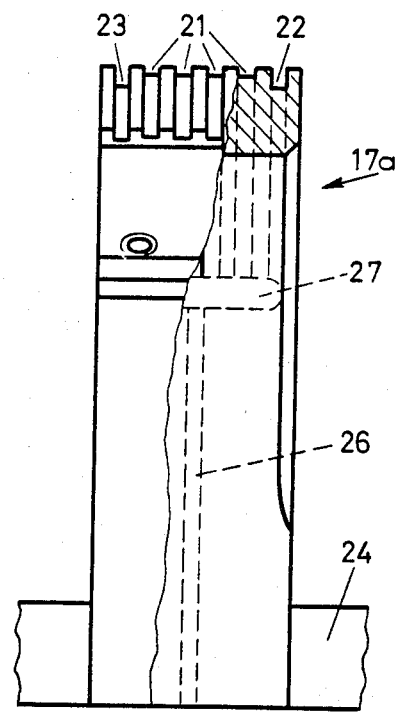
FIG. 5 is an elevational end view, partially in section, of the structure shown in FIG. 4.

Turning now to FIGS. 4 and 5, the support ring 17a shown therein differs from that shown in FIG. 2 in that a separate shaping shoulder 20a is provided which has bores 26, 30 and grooves 21, 22 and 23 for guiding a coolant. The forming shoulder 20a is secured to the support ring 17a by means of screws 28 (only one shown). In this embodiment, the support rings have the shape of an axially cut hollow cylinder with circumferential grooves 21. The two outermost grooves 22 and 23 have a slightly greater depth than the other grooves 21. The reasons for this arrangement will become apparent as the specification progresses. The individual strips formed from the wrapper sheets B1 and B2 are, with this arrangement, guided in an accurately aligned manner to the shaping shoulder 20 or 20a so that a lateral runoff cannot occur. The forming shoulder 20 or 20a, by means of which the outer parts of the strips are, as compared to the mid portions, raised, guide the strips, again in an aligned manner, to the sealing station S (FIGS. 1 and 2). The edges of the strips lie throughout their entire path along the support rings 17 and 18, on the sealing discs 60–63 so that the wrapper sheet material is locally preheated. The strips are subsequently pressed and sealed together by the nip of the cooperating rollers 60–63 (sealing station S).

If now a coolant such as air is blown in the direction of the arrow in FIG. 4 through the bore 26 into the transverse groove 27 and the grooves 21, 22 and 23, only the edge portions of the wrapper strips can be heated and thus the mid portions will not be affected. In order to further ensure that exclusively only the edge portions of the strips are heated, the two flanking grooves 22 and 23 are deeper to ensure that a stronger air stream is generated. Since, in addition, the shaping shouler 20a surrounds the hollow space entirely at the sealing station S, and the coolant in the grooves cools the support rings, no heat radiation from the carrier rollers 65 and 66 will occur towards the bags and thus the hollow mandrel 4 or 4a is screened from heat effects. The coolant may leave through the grooves 29 and 30 provided in the forming shoulder 20a. By means of these measures, material such as sugar may be handled without the risk of caramelization.

It is a further advantage of the invention that the charging cross section as represented by the hollow mandrel 4a, may be of relatively large area. Because of the defined large-angle loop-around about the sealing discs 60–63, the temperature may be maintained at a relatively low level which ensures that even in case of a standstill of the packaging machine the packaging material will not be damaged by heat. Such lower temperatures also result in an overall lesser heating of the entire product delivery.

By virtue of the enlarged charging cross section, air can better escape from the bag and in a shorter period of time a larger quantity of goods may be charged, whereby the output of the packaging machine is increased.

It will be understood that the above description of the present invention is susceptible to various modifications, changes and adaptations, and the same are intended to be comprehended witin the meaning and range of equivalents of the appended claims.

What is claimed is:

1. In an apparatus for making sealed packages from two superposed, sealable flexible wrapper sheets, comprising
    (a) first and second support rings each having a peripheral guiding surface of outwardly convex circumferential course; said support rings being radially adjacent for guiding respective first and second wrapper sheets towards one another into a superpositioned alinged relationship;
    (b) means defining a plurality of radial grooves on the guiding surface of each said support ring;
    (c) first and second sealing discs supported coaxially with said first and second support rings, respectively, at opposite sides thereof; each sealing disc having a peripheral working surface; on each side of the first and second support rings one of said first sealing discs and one of said second sealing discs forming a sealing disc pair for longitudinally pressing and sealing together said first and second wrapper sheets along opposite edge zones thereof, whereby opposite longitudinal seams are formed in the superposed running sheets parallel to a running direction thereof;
    (d) means for rotatably supporting said sealing discs;
    (e) first and second sheet deflecting rollers situated radially adjacent and upstream of the respective said first and second support rings as viewed in said running direction for defining loop-around paths for said first and second wrapper sheets on the respective said first and second support rings;
    (f) first and second shaping means carried on the respective first and second support rings for shaping said first and second wrapper sheets immediately upstream of said sealing discs;
    (g) transverse sealing means situated downstream of said sealing discs for sequentially providing transverse seams on said sheets; and
    (h) cutting means for severing the sealed sheets into predetermined lengths whereby packages of defined dimensions are obtained.

2. An apparatus as defined in claim 1, wherein there are provided a plurality of axially aligned first support rings with associated first sealing discs and a plurality of axially aligned second support rings with associated second sealing discs for producing simultaneously a plurality of side-by-side arranged packages.

3. An apparatus as defined in claim 2, further comprising a cutting element situated between adjoining first support rings and between adjoining second support rings for longitudinally subdividing said first and second wrapper sheets.

4. An apparatus as defined in claim 3, wherein the cutting elements are circular rotary knives.

5. In an apparatus for making sealed packages from two superposed, sealable flexible wrapper sheets, comprising
 (a) first and second support rings each having a peripheral guiding surface of outwardly convex circumferential course; said support rings being radially adjacent for guiding respective first and second wrapper sheets towards one another into a superpositioned aligned relationship;
 (b) first and second sealing discs supported coaxially with said first and second support rings, respectively, at opposite sides thereof; each sealing disc having a peripheral working surface; on each side of the first and second support rings one of said first sealing discs and one of said second sealing discs forming a sealing disc pair for longitudinally pressing and sealing together said first and second wrapper sheets along opposite edge zones thereof, whereby opposite longitudinal seams are formed in the superposed running sheets parallel to a running direction thereof;
 (c) means for rotatably supporting said sealing discs;
 (d) first and second sheet deflecting rollers situated radially adjacent and upstream of the respective said first and second support rings as viewed in said running direction for defining loop-around paths for said first and second wrapper sheets on the respective said first and second support rings;
 (e) first and second shaping means carried on the respective first and second support rings for shaping said first and second wrapper sheets immediately upstream of said sealing discs; said shaping means being components separate from said support rings;
 (f) connecting means for mounting said shaping means on said support ring;
 (g) transverse sealing means situated downstream of said sealing discs for sequentially providing transverse seams on said sheets; and
 (h) cutting means for severing the sealed sheets into predetermined lengths whereby packages of defined dimensions are obtained.

6. An apparatus as defined in claim 5, wherein there are provided a plurality of axially aligned first support rings with associated first sealing discs and a plurality of axially aligned second support rings with associated second sealing discs for producing simultaneously a plurality of side-by-side arranged packages.

7. An apparatus as defined in claim 6, further comprising a cutting element situated between adjoining first support rings and between adjoining second support rings for longitudinally subdividing said first and second wrapper sheets.

8. An apparatus as defined in claim 7, wherein the cutting elements are circular rotary knives.

9. In an apparatus for making sealed packages from two superposed, sealable flexible wrapper sheets, comprising
 (a) first and second support rings each having a peripheral guiding surface of outwardly convex circumferential course; said support rings being radially adjacent for guiding respective first and second wrapper sheets towards one another into a superpositioned aligned relationship;
 (b) means defining coolant bores in said supprt rings;
 (c) first and second sealing discs supported coaxially with said first and second support rings, respectively, at opposite sides thereof; each sealing disc having a peripheral working surface; on each side of the first and second support rings one of said first sealing discs and one of said second sealing discs forming a sealing disc pair for longitudinally pressing and sealing together said first and second wrapper sheets along opposite edge zones thereof, whereby opposite longitudinal seams are formed in the superposed running sheets parallel to a running direction thereof;
 (d) support rollers carrying said sealing discs in a coaxial relationshp therewith;
 (e) heating elements arranged in said support rollers for heating said sealing discs;
 (f) first and second sheet deflecting rollers situated radially adjacent and upstream of the respective said first and second support rings as viewed in said running direction for defining loop-around paths for said first and second wrapper sheets on the respective said first and second support rings;
 (g) first and second shaping means carried on the respective first and second support rings for shaping said first and second wrapper sheets immediately upstream of said sealing discs;
 (h) transverse sealing means situated downstream of said sealing discs for sequentially providing transverse seams on said sheets; and
 (i) cutting means for severing the sealed sheets into predetermined lengths whereby packages of defined dimensions are obtained.

10. An apparatus as defined in claim 9, wherein there are provided a plurality of axially aligned first support rings with associated first sealing discs and a plurality of axially aligned second support rings with associated second sealing discs for producing simultaneously a plurality of side-by-side arranged packages.

11. An apparatus as defined in claim 10, further comprising a cutting element situated between adjoining first support rings and between adjoining second support rings for longitudinally subdividing said first and second wrappersheets.

12. An apparatus as defined in claim 11, wherein the cutting elements are circular rotary knives.

13. In an apparatus for making sealed packages from two superposed, sealable flexible wrapper sheets, comprising
 (a) first and second support rings each having a peripheral guiding surface of outwardly convex circumferential course; said support rings being radially adjacent for guiding respective first and second wrapper sheets towards one another into a superpositioned aligned relationship; said support rings including parts having a shape of a laterally open hollow cylinder;
 (b) first and second sealing discs supported coaxially with said first and second support rings, respectively, at opposite sides thereof; each sealing disc having a peripheral working surface; on each side of the first and second support rings one of said first sealing discs and one of said second sealing discs forming a sealing disc pair for longitudinally pressing and sealing together said first and second wrapper sheets along opposite edge zones thereof, whereby opposite longitudinal seams are formed in the superposed running sheets parallel to a running direction thereof; the peripheral working surfaces of said first and second sealing discs are in alignment with the peripheral guiding surfaces of the respective first and second support rings;

(c) support rollers carrying said sealing discs in a coaxial relationship therewith; said support rings being arranged coaxially with respect to and radially spaced from respective said support rollers;

(d) heating elements arranged in said support rollers for heating said sealing discs;

(e) first and second sheet deflecting rollers situated radially adjacent and upstream of the respective said first and second support rings as viewed in said running direction for defining loop-around paths for said first and second wrapper sheets on the respective said first and second support rings;

(f) first and second shaping means carried on the respective first and second support rings for shaping said first and second wrapper sheets immediately upstream of said sealing discs;

(g) transverse sealing means situated downsream of said sealing discs for sequentially providing transverse seams on said sheets; and (h) cutting means for severing the sealed sheets into predetermined lengths whereby packages of defined dimensions are obtained.

14. An apparatus as defined in claim 13, wherein there are provided a plurality of axially aligned first support rings with associated first sealing discs and a plurality of axially aligned second support rings with associated second sealing discs for producing simultaneously a plurality of side-by-side arranged packages.

15. An apparatus as defined in claim 14, further comprising a cutting element situated between adjoining first support rings and between adjoining second support rings for longitudinally subdividing said first and second wrapper sheets.

16. An apparatus as defined in claim 15, wherein the cutting elements are circular rotary knives.

17. In an apparatus for making sealed packages from two superposed, sealable flexible wrapper sheets, comprising (a) first and second support rings each having a peripheral guiding surface of outwardly convex circumferential course; said support rings being radially adjacent for guiding respective first and second wrapper sheets towards one another into a superpositioned aligned relationship;

(b) first and second sealing discs supported coaxially with said first and second support rings, respectively, at opposite sides thereof; each sealing disc having a peripheral working surface; on each side of the first and second support rings one of said first sealing discs and one of said second sealing discs forming a sealing disc pair for longitudinally pressing and sealing together said first and second wrapper sheets along opposite edge zones thereof, whereby opposite longitudinal seams are formed in the superposed running sheets parallel to a running direction thereof;

(c) means for rotatably supporting said sealing discs;

(d) first and second sheet deflecting rollers situated radially adjacent and upstream of the respective said first and second support rings as viewed in said running direction for defining loop-around paths for said first and second wrapper sheets on the respective said first and second support rings;

(e) first and second shaping means carried on the respective first and second support rings for shaping said first and second wrapper sheets immediately upstream of said sealing discs; said first and second shaping means including respective first and second shaping shoulders radially projecting beyond respective said first and second sealing discs; locations of contact between peripherally cooperating first and second sealing discs being situated downstream of said shaping shoulders;

(f) transverse sealing means situated downstream of said sealing discs for sequentially providing transverse seams on said sheets; and (g) cutting means for severing the sealed sheets into predetermined lengths whereby packages of defined dimensions are obtained.

18. An apparatus as defined in claim 17, wherein there are provided a plurality of axially aligned first support rings with associated first sealing discs and a plurality of axially aligned second support rings with associated second sealing discs for producing simultaneously a plurality of side-by-side arranged packages.

19. An apparatus as defined in claim 18, further comprising a cutting element situated between adjoining first support rings and between adjoining second support rings for longitudinally subdividing said first and second wrapper sheets.

20. An apparatus as defined in claim 17, wherein said shaping shoulders have, adjacent said locations, outwardly concave arcuate portions and extend tangentially to the peripheral working surfaces of respective said sealing discs.

* * * * *